United States Patent [19]

Riley

[11] 4,013,341
[45] Mar. 22, 1977

[54] COLLAPSIBLE BINOCULAR INSTRUMENT

[76] Inventor: William T. Riley, 900 Welch Road, Suite 205, Palo Alto, Calif. 94303

[22] Filed: Feb. 4, 1976

[21] Appl. No.: 655,185

Related U.S. Application Data

[63] Continuation-in-part of Ser. No. 540,377, Jan. 13, 1975, abandoned.

[52] U.S. Cl. .................................. 350/70; 350/145
[51] Int. Cl.² ...................... G02B 7/02; G02B 27/02
[58] Field of Search ............... 350/70, 140, 73, 74, 350/78, 145, 146; 206/316; 229/41 B; 40/63 A, 64 A

[56] References Cited

UNITED STATES PATENTS

894,665  7/1908  Kissner ............................. 350/70

Primary Examiner—John K. Corbin
Assistant Examiner—Jon W. Henry
Attorney, Agent, or Firm—Townsend and Townsend

[57] ABSTRACT

A low cost compact folding binocular which collapses for storage to a relatively thin package and which includes the customary focus and interpupillary distance adjustments. A pair of complementary housings comprising an objective lens section and an ocular lens section provide a pair of laterally spaced column portions adapted to be mutually slidably engaged in telescoping relation. A retractable or removable lens holder element having a lens secured thereto or integrally formed therein is attached to one end of each of the column portions. A central web portion joining at least one of the pairs of laterally spaced column portions and fabricated from a flexible material permits the lateral spacing of the column portions to be manually adjusted to provide the interpupillary adjustment. Focus adjustment is provided by the telescoping relationship between the column portions of the two sections. A biasing spring or strip of unitary springlike material automatically extends each retractable lens holder element to the viewing position when the instrument is unfolded. Alternatively, each lens holder element is provided with a pull tab to enable manual extension thereof. The removable lens holder elements are dimensioned to be snugly received by the end of the corresponding column portion to enable manual fitting and removal. A flexible cord passing through the several elements of the embodiments employing removable lens holder elements prevents loss of individual elements and may also serve as a neck strap.

31 Claims, 26 Drawing Figures

COLLAPSIBLE BINOCULAR INSTRUMENT

CROSS REFERENCE TO RELATED APPLICATIONS

This application is a continuation-in-part of U.S. patent application Ser. No. 540,377 filed Jan. 13, 1975 and now abandoned for "Collapsible Binocular Instrument".

BACKGROUND OF THE INVENTION

This invention relates generally to optical instruments and in particular to an improved binocular instrument which is extremely simple and inexpensive to manufacture, rugged in construction, highly portable and collapsible for convenient storage when not in use.

Portable binoculars have been widely used to enhance a spectator's enjoyment of a particular event, e.g. football, baseball, soccer and other sports events; opera, ballet symphony, popular concerts or other cultural events; at zoos, amusement parks, on school field trips, etc. While many portable compact binoculars have been proposed in the past, and some have even been commercialized, to date the need for a simple, inexpensive, adjustable, collapsible, pocket size binocular remains unfulfilled.

SUMMARY OF THE INVENTION

The invention comprises an extremely low cost impact binocular which collapses for storage to a relatively thin package of a size and dimension to be accommodated in a shirt pocket or purse and which provides for both the customary focus and interpupillary distance adjustments.

The preferred embodiment comprises a pair of complementary housings termed an objective lens section and an ocular lens section each configured in a shape providing a pair of laterally spaced columnar portions adapted to be mutually slidably engaged in telescoping relation. One end of each of the columnar portions of each section is provided with a moveable lens holder element to which a lens of the proper type — i.e. objective or ocular — is either secured or integrally formed. A central web portion provided on at least one of the two sections and fabricated from a pliable or flexible material permits the lateral spacing of the columnar portions to be manually adjusted to provide the interpupillary adjustment. Focus adjustment is provided by a telescoping relationship between the columnar portions of the two sections.

In a first type of instrument fabricated according to the invention, the lens holder elements are all pivotally arranged at the end of their respective columnar portions, and are preferably integrally formed therewith. In an alternate type, the lens holder elements are all removably secured at the end of their respective columnar portions, and are preferably dimensioned and configured to be snugly received therein.

When an instrument of the first type is stored in the collapsed state, the columnar portions are folded flat with the lens holder elements in a retracted position to protect the lens surfaces. To ready the instrument for viewing, the columnar portions are unfolded and the lens holder elements extended to the viewing position in which the individual lenses are arranged with their viewing axes substantially parallel to the axis of the respective columnar portion in which they are located. To facilitate extension of lens holder elements to the viewing position, individual pull tabs are optionally secured to the lens holder elements, the pull tabs extending outwardly of the housing so that they may be grasped by the user. Alternatively, biasing means comprising a spring or a unitary strip of spring-like material are arranged in contact with the surface of the housing and a surface of the lens holder element to provide automatic extension of the lens holder elements to the viewing position when the instrument is unfolded.

When an instrument of the second type is stored in the collapsed state, the columnar portions are folded flat with the lens holders removed. To ready the instrument for viewing, the columnar portions are unfolded and each lens holder element is pressed into engagement with the end of its corresponding columnar portion. To deter loss of individual elements, particularly when the instrument is in the collaped state, a flexible cord is looped through these elements and secured against removal. Preferably, the length of the flexible cord is sufficient to serve as a neck strap during viewing.

In either type of instrument, the interpupillary distance is adjusted during viewing by flexing the web manually and the focus is adjusted by sliding the two sections inwardly or outwardly in a direction parallel to the optical axis of the instrument. By using reverse procedures, either type of instrument may be collapsed for convenient storage.

For a fuller understanding of the nature and advantages of the invention reference should be used to the ensuing detailed description taken in conjunction with the accompanying drawings.

BRIEF DESCRIPTION OF THE DRAWINGS

FIG. 14 is an enlarged sectional view of an alternate embodiment illustrating an arrangement for locking a lens holder element in the viewing position;

DESCRIPTION OF THE PREFERRED EMBODIMENT

Figure 1:
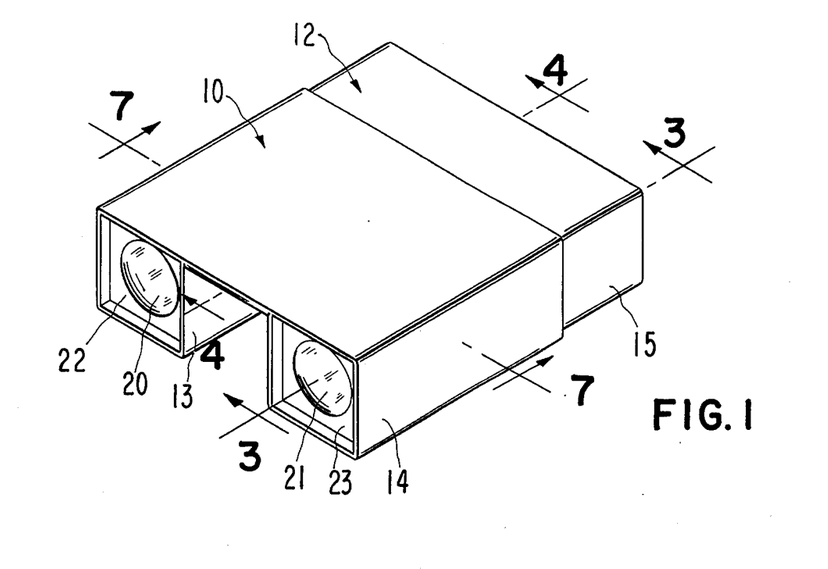
FIG. 1 is a perspective view of a preferred embodiment of the invention in the viewing configuration.

Turning now to the drawings, FIG. 1 illustrates in perspective a preferred embodiment of the invention ready for viewing by a user. As seen in this FIG., the binocular instrument comprises a pair of mating sections generally designated by reference numerals 10, 12 termed the objective lens section and the ocular lens section, respectively. Preferably each section 10, 12 is fabricated as an internal construction, e.g. from a single sheet of cardboard, leather, paper, or molded plastic or any other suitable equivalent or combination of materials known to those skilled in the art. Each section is formed with a pair of columnar portions, such as 13, 14 of the objective lens section (FIGS. 1 and 5), and 15, 16 of the ocular lens section (FIGS. 1 and 6).

A pair of objective lenses 20, 21 are each mounted in a different lens holder 22, 23, respectively, in columnar portions 13, 14 of objective lens section 10. A pair of ocular lenses 30, 31 are similarly mounted in a pair of ocular lens holder elements 32, 33, respectively, secured to the viewing end of columnar portions 15, 16 of ocular lens section 12. The respective lens elements 20, 21, 30, 31 may be secured to the apertures in lens holder elements 22, 23, 32, 33 in any suitable fashion, such as by gluing, thermobonding or the like. Lenses 20, 21, 30, 31 are preferably molded from plastic of optical quality, but may also be constructed from optical glass or any other suitable equivalent material known to those skilled in the art. While the optical parameters may be designed in accordance with the requirements of any given application, best results have been obtained with binocular instruments having an optical power from about two to about eight power. The field of view depends on the dimension limitations of the particular instrument and the desired optical specifications.

Figure 3:
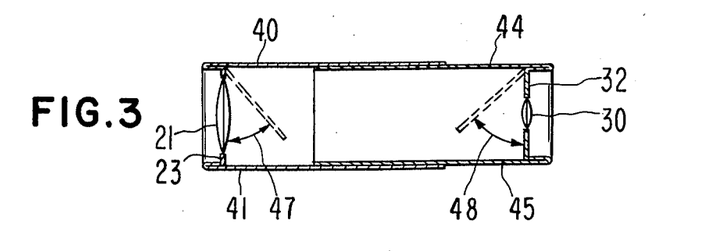
FIG. 3 is a sectional view taken along lines 3—3 of FIG. 1.

As best shown in FIG. 3, the lens holder element 23 is integrally formed with a re-entrant portion of the top wall 40 of objective lens section 10 and is dimensioned to snugly abut a limit stop formed by a re-entrant portion of the bottom wall 41 of objective lens section 10. Similarly, ocular lens holder element 32 is integrally formed with a re-entrant portion of the top wall 44 of ocular lens section 12 and is dimensioned to snugly abut a limit stop formed by a re-entrant portion of the bottom wall 45 of ocular lens section 12. As indicated by the broken line positions and arrows 47, 48, each lens holder element retracts when the binocular instrument is folded to the collapsed state and assumes an attitude substantially parallel to the respective top wall of the associated lens section. The hinge portions of the lens holder elements are preferably fabricated from polypropylene or other equivalent material having a molecular memory to facilitate unassisted movement of these elements to their extreme position, such as the viewing configuration illustrated in full in FIG. 3.

Figure 4:
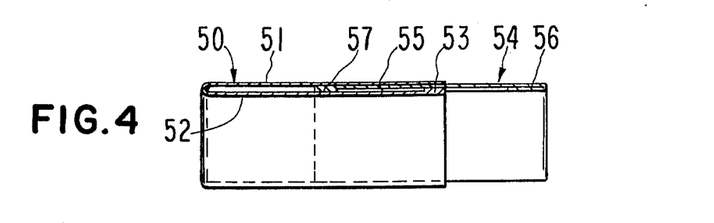
FIG. 4 is a sectional view taken along lines 4—4 of FIG. 1.
Figure 5:
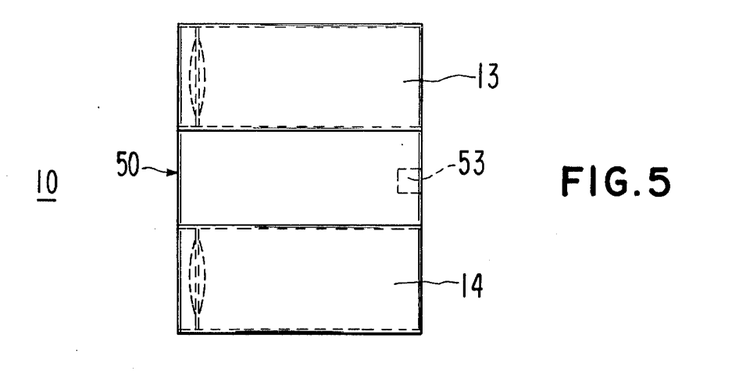
FIG. 5 is a bottom plan view of the objective lens section of the FIG. 1 embodiment.
Figure 6:
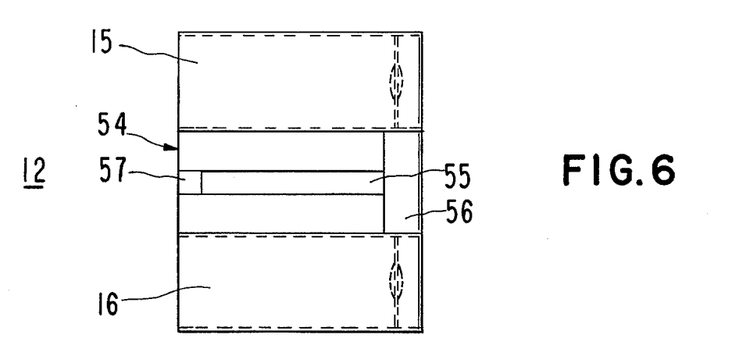
FIG. 6 is a bottom plan view of the ocular lens section of the FIG. 1 embodiment.
Figure 7:
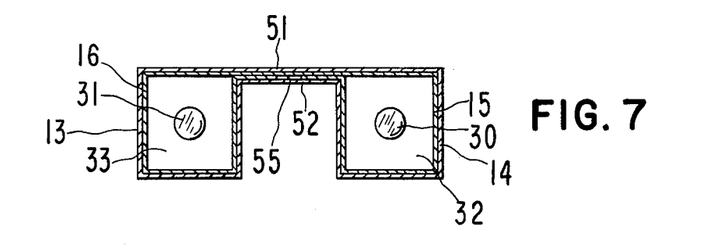
FIG. 7 is a sectional view taken along lines 7—7 of FIG. 1.

As best shown in FIGS. 4 and 5, objective lens section 10 has an interconnecting web portion 50 comprising a pair of spaced walls 51, 52, the ocular end of wall 52 having a projection 53.

As best shown in FIG. 6, ocular lens section 12 has an interconnecting web portion generally designated by reference numeral 54 having a central channel portion 55 formed therein, an end portion 56 defining the ocular end of channel 55, and a projection 57.

As best shown in FIG. 4, when the instrument is assembled with web 50 slideably embracing web portion 54, projection 53 is received in channel 55 and cooperates with projection 57 to prevent inadvertent separation of lens sections 10, 12.

Figure 8:
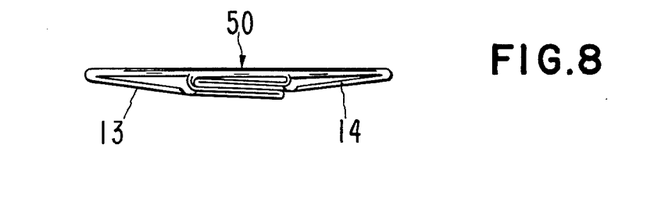
FIG. 8 is an end elevational view showing the invention in the collapsed state.

In use, with the binocular instrument in the erected state shown in FIG. 1, the interpupillary adjustment may be made by the user by grasping the instrument on the outward corners of the columnar portions 13, 14 and flexing the instrument to deform web portions 50, 54 until the proper image is obtained. The instrument may be focused by simply sliding the two lens sections 10, 12 along their mutually parallel axes until focus is achieved. When it is desired to store the instrument, the lens holder elements 22, 23, 32, 33 are partially retracted by the finger, or a very small stylus such as a pen or pencil and the columnar portions 13, 14, 15 and 16 are folded flat until the instrument achieves the configuration illustrated in FIG. 8. The instrument may now be stored in any convenient receptacle, a pocket, a purse or the like. Alternatively, before collapsing, the two lens sections 10, 12 may be enforceably separated and individually collapsed and stored.

Figure 9:
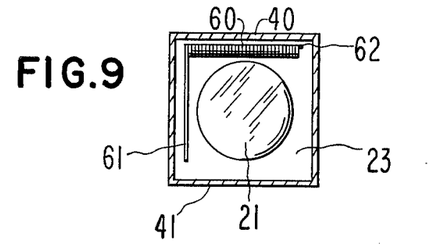
FIG. 9 is an interior view of an alternate embodiment illustrating a lens holder biasing device.

FIG. 9 illustrates an alternate arrangement providing automatic extension of a lens holder element to the viewing position when the instrument is unfolded. As seen in this FIG., a small bias spring 60 is secured to the inner upper edge of lens holder element 23. A first end 61 of spring 60 extends generally downwardly along the inner surface of lens holder element 23. Another arm 62 extends along the inner surface of top wall 40 of objective lens section 10 in a direction substantially othogonal to arm 61. Spring 60 may be secured to lens holder element 40 by any suitable means, such as an adhesive. Alternatively, spring 60 may be adhered to the inner surface of top wall 40, if desired. In operation, when the instrument is in the folded or collapsed state with lens holder element 23 in the retracted position, spring 60 is placed in tension by movement of arm 61 through an angle of approximately 90°. When the instrument is erected or unfolded, the tensioned spring 60 causes lens holder element 23 to pivot downwardly to the position shown in FIG. 3.

Figure 10:
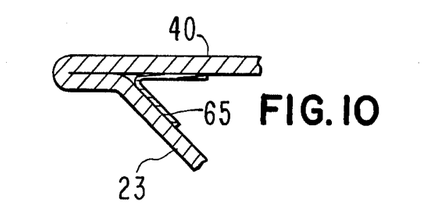
FIG. 10 is an enlarged fragmentary sectional view of an alternate embodiment illustrating a different lens holder biasing device.

FIG. 10 illustrates an alternate biasing arrangement. In this embodiment, a strip of springlike material, e.g. a spring steel blade, a plastic such as polypropylene, or the like, is attached to the inner surface of top wall 40 and the inner surface of the upper edge of lens holder element 23. In operation, when lens holder element is in the retracted position, element 65 is in a tensioned state. When the instrument is unfolded, element 55 provides a bias force urging lens holder element 23 to the erected attitude. Although element 65 is illustrated as being positioned to the interior of elements 23, 40 this element may be adhered to the outer surface of top wall 40 and lens holder element 23 to accomplish the same result.

Figure 11A:
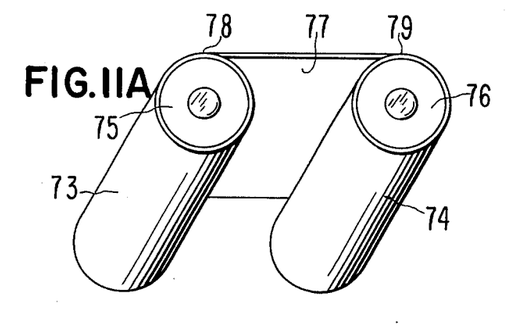
FIGS. 11A, B–13A, B are perspective views illustrating alternate embodiments having various geometrical shapes.
Figure 11B:
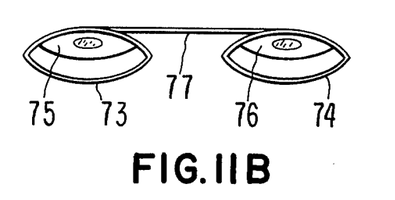

Although the embodiment discussed supra is illustrated as having columnar portions 13-16 of rectangular cross section, the invention is not limited to rectangular shapes alone. FIGS. 11A, B for example illustrate an alternate embodiment having ocular columnar portions 73, 74 with a substantially cylindrically cross sectional shape joined by web element 77. In this embodiment, the ocular lens holder elements 75, 76 are substantially circular as illustrated, with the exception of attaching portions 78, 79 which are flat.

Figures 12A, 12B, 13A, 13B, 14:
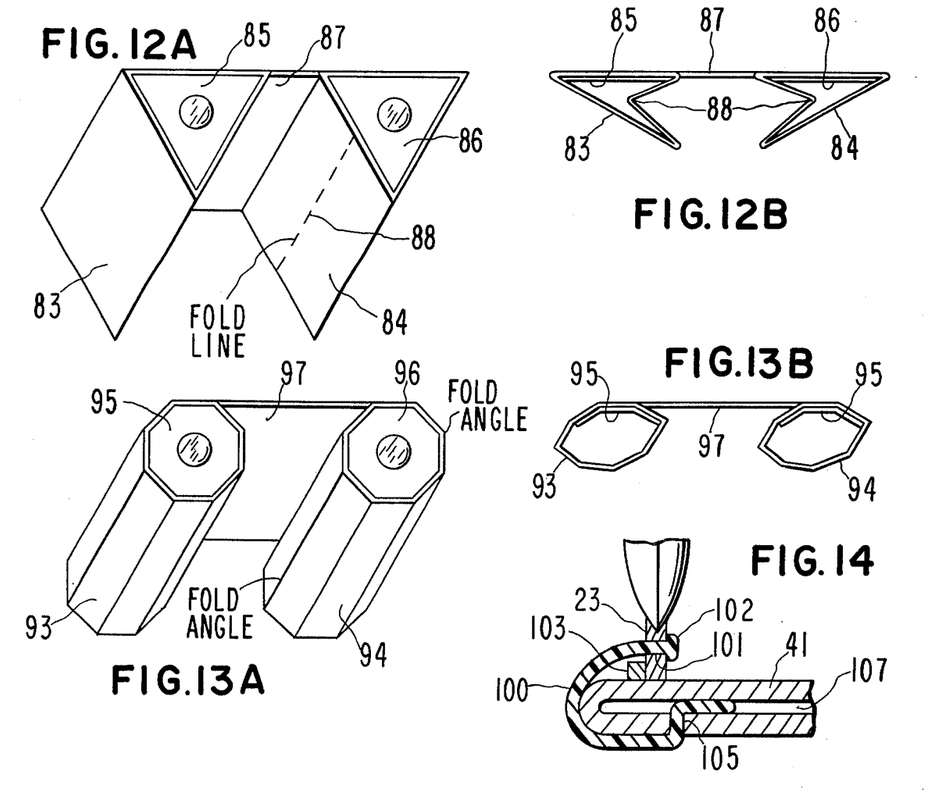

FIGS. 12A, B illustrate another embodiment in which ocular columnar portions 84, 84 and ocular lens holding elements 85, 86 are triangular in cross section, with ocular columnar portions 83, 84 being joined by web 87. In this embodiment, each ocular columnar portion 83, 84 may be provided with a longitudinal score designated by reference numeral 88 to facilitate folding of the instrument in the manner illustrated in FIG. 12B.

FIGS. 13A, B illustrate still another embodiment having ocular columnar portions 93, 94 joined by web 97, and ocular lens holder elements 95, 96 with an octagonal shape. FIG. 13B illustrates the manner of folding this embodiment.

If desired, a pull tab may be included to facilitate manipulation of the lens holder elements to the erected state. FIG. 14 shows a preferred embodiment of a pull tab 100 which may be fabricated from leather, plastic, cardboard, paper or other suitable flexible material. As shown in this FIG., pull tab 100 is received at one end in a slot 101 formed in the lower portion of lens holder element 23. Tab 100 is provided with an enlarged end portion 102 which provides a positive pulling action on lens holder element 23 during extension to the erected state. A stop member 103 is adhered to the upper surface of bottom wall 41 which is fabricated to a double-walled thickness as shown. The lower portion of bottom wall member 41 is provided with a slot 105 into which the free end of pull tab 100 can be inserted in order to tuck this end into the space 107 provided in wall member 41. Other equivalent arrangements will occur to those skilled in the art.

Figures 15, 16:
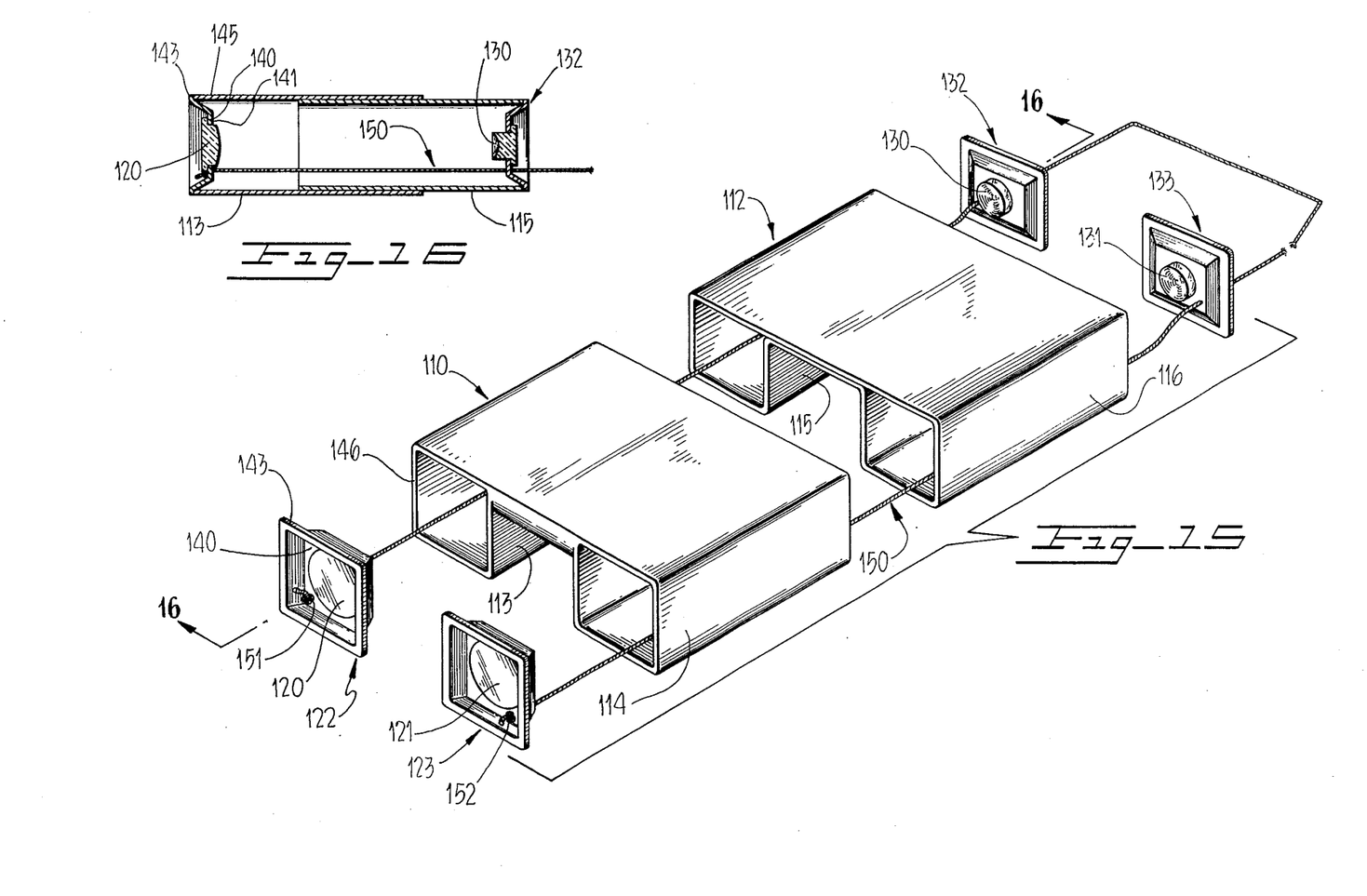
FIG. 15 is an exploded perspective view of an alternate embodiment employing removable lens holder elements.
FIG. 16 is a sectional view taken along lines 16—16 of FIG. 15 with the device assembled.

FIGS. 15 and 16 illustrate an alternate embodiment of the invention in which the lens holder elements are completely removable for shipping and storage. As seen in these FIGS., the instrument comprises a pair of mating sections generally designated by reference numerals 110, 112 which are configured in a substantially identical manner to elements 10, 12 described supra, and which include columnar portions 113, 114 of objective lens section 110 and columnar portions 115, 116 of ocular lens section 112. A pair of objective lenses 120, 121 are each mounted in a different lens holder generally designated by reference numeral 122, 123 in columnar portions 113, 114 of objective lens section 110. A pair of ocular lenses 130, 131 are similarly mounted in a pair of ocular lens holder elements generally designated by reference numerals 132, 133 in columnar portions 115, 116 of ocular lens section 112. The respective lens elements 120, 121, 130, 131 may be secured to the apertures in lens holder element 122, 123, 132, 133 in any suitable fashion, such as by gluing, thermobonding or the like. Lenses 120, 121, 130, 131 are preferably molded from plastic of optical quality, but also may be constructed from optical glass or any other suitable equivalent material known to those skilled in the art. The design considerations for these lenses are substantially identical to those discussed supra with respect to elements 20, 21, 30 and 31.

Lens holder element 122 has a central region 140 with a central aperture 141 in which the central body portion of reduced diameter of lens 120 is received, a flanged portion 143 having a perimetral geometrical configuration substantially similar to that of the end of columnar portion 113 (illustrated as square), and intermediate portion 145 joining portions 140 and 143 and which is tapered inwardly in the direction of the latter element. Flange portion 143 provided an abutment stop against end surface 146 of columnar portion 113 when lens holder element 122 is installed. The recessed construction afforded by intermediate portion 145 affords protection for lens 120 against physical abrasion. Lens holder element 122 is preferably fabricated as a unitary member from a suitable material, such as molded plastic. The structure of remaining lens holder elements 123, 132 and 133 is essentially similar to that of lens holder element 122.

To assemble the embodiment of FIGS. 15 and 16 from the collapsed state to the viewing state, sections 110 and 112 are first erected to the configuration shown, and the individual lens holder elements 122, 123, 132 and 133 are simply press fitted into the end of the corresponding columnar portion. To store the instrument after use, the lens holder elements 122, 123, 132, and 133 are pried loose from sections 110, 112, after which the latter elements may be folded in the usual manner.

In order to prevent loss of the individual elements of the embodiment of FIG. 15 and 16, a flexible cord 150 is provided which is passed through appropriate apertures in elements 122, 123, 132 and 133 and also through the hollow interior of columnar portions 113–116. To prevent removal of the cord 150, the ends thereof are knotted as at 151 and 152. The same result may be achieved with a plastic cord fabricated from a material such as nylon by applying momentary heat to the ends of a sufficient temperature to cause the material to flow and form an enlarged ball or knob. Other equivalent arrangements, such as taping or gluing the free ends of cord 150, may be employed, as desired. Preferably, the length of cord 150 is sufficient to pass over the head of the user and serve as a neck strap when the instrument is in use for viewing.

While the embodiment of FIGS. 15 and 16 is illustrated having a square cross-sectional shape for columnar portions 113-116, the alternate geometrical shapes illustrated in FIGS. 11A, B to 13A, B may also be employed, as desired.

Figures 17, 18, 21, 22, 23:
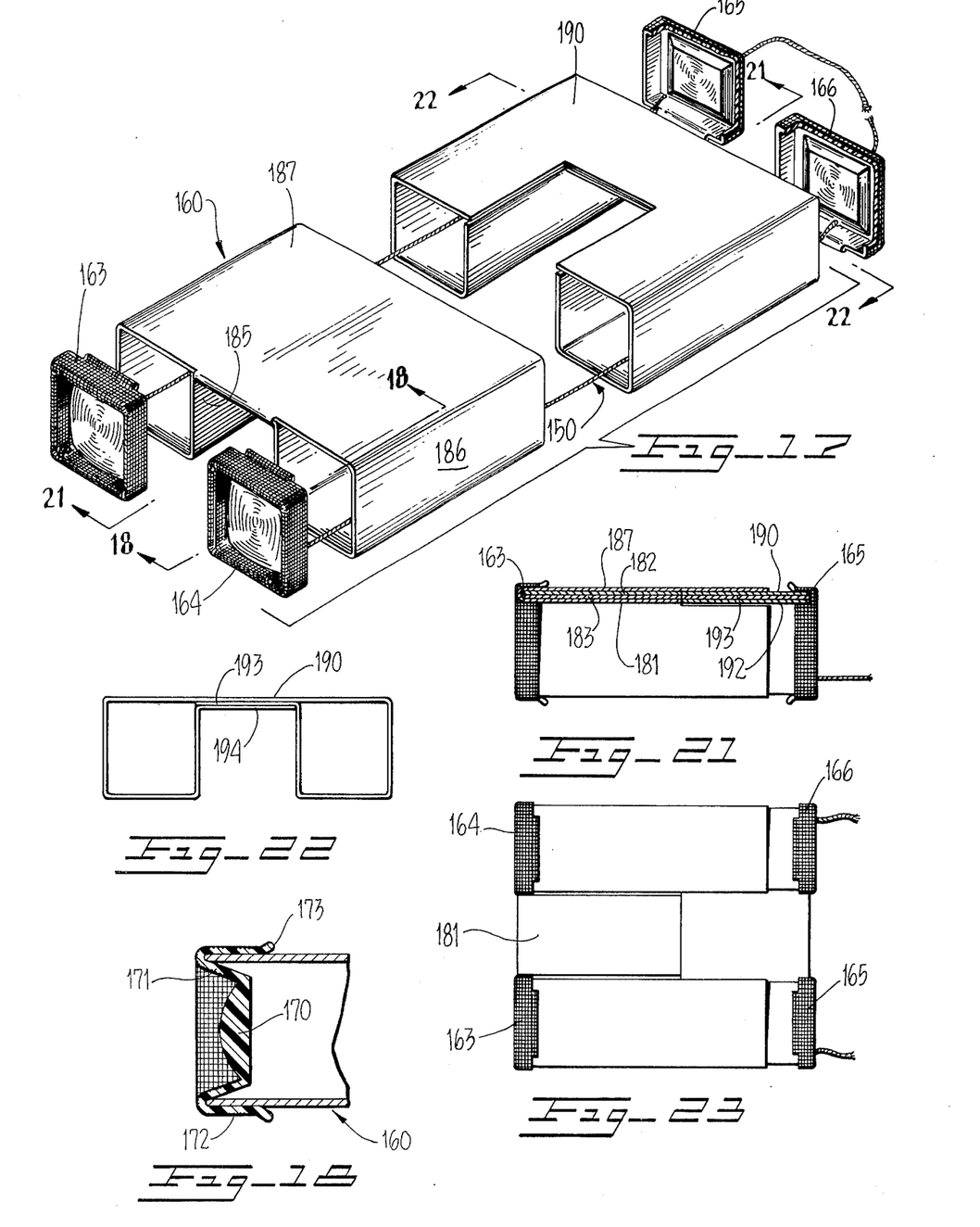
FIG. 17 is an exploded perspective view of an alternate embodiment of the invention.
FIG. 18 is an enlarged sectional view taken along lines 18—18 of FIG. 17 with the device assembled.
FIG. 21 is a sectional view taken along lines 21-21 of FIG. 17 with the device assembled.
FIG. 22 is an end view of the ocular lens section of the FIG. 17 embodiment.
FIG. 23 is a bottom plan view of the FIG. 17 embodiment with the two lens sections fully telescoped.

FIG. 17–23 illustrate other alternate embodiments of the invention incorporating one piece integrally molded lenses and removable lens holder elements and a simplified form of construction for the objective and ocular lens sections, 160, 162. As best shown in FIGS. 17 and 18, each one of the four removable lens holder elements 163–166 comprises a one piece molded member having a central lens region 170 of optical quality, an intermediate tapered wall portion of generally rectangular configuration 171 and a re-entrant outer flange portion 172 with an outwardly turned end portion 173, the latter to facilitate removal of the lens holder element.

Central lens region 170 provides a lens surface which completely completely occupies the generally rectangular area defined by the junction of this region with tapered wall portion 171. If desired, the lens surface afforded by region 170 may be formed with a circular perimeter inwardly of the junction to provide a lens similar to descrete lens 120, 130 of the embodiment of FIGS. 15 and 16.

The outer surfaces of tapered wall portion 171 and flange portion 172 are scored or etched in order to scatter, diffuse or reflect light incident thereto so that the lens properties are determined by central lens region 170. Alternative means, such as painting or dyeing portions 171 and 172 may be employed, as desired, for this purpose.

Figure 19:
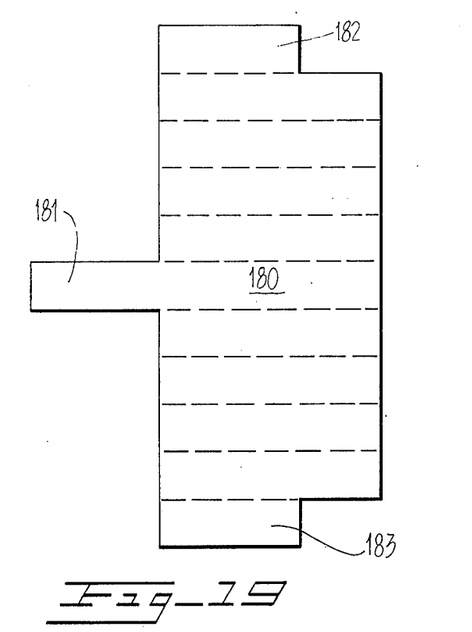
FIGS. 19 and 20 are plan views of blanks used to fabricate the FIG. 17 embodiment.

FIG. 19 illustrates the blank from which objective lens section 160 is formed and is seen to include a generally rectangular central body portion 180 from which three tab portions 181, 182 and 183 extend. Objective lens system 160 is formed by folding the blank of FIG. 19 along horizontal fold lines shown as broken lines to form the spaced columnar portions 185, 186, overlapping tab portions 182, 183 in the central interconnecting web region 187, folding tab portion 181 underneath and rearwardly, and applying a suitable cement or heat bonding the three tab portions 181–183 together to the undersurface of central body portion 180.

Figure 20:
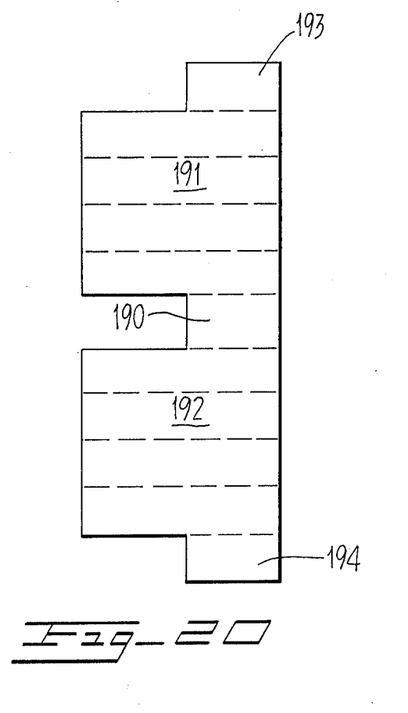

FIG. 20 illustrates the blank used to form ocular lens section 162 and is seen to include a central web portion 190 and two generally rectangular body portions 191, 192 which symmetrically flank web portion 190, each provided with a tab-like portion 193, 194, respectively. Ocular lens section 162 is formed by folding portions 191, 192 along the horizontal fold lines, folding tab portions 193 and 194 under web portion 190 and securing these three elements together by an adhesive, thermal bonding or other similar process (see FIG. 20).

Figure 2:
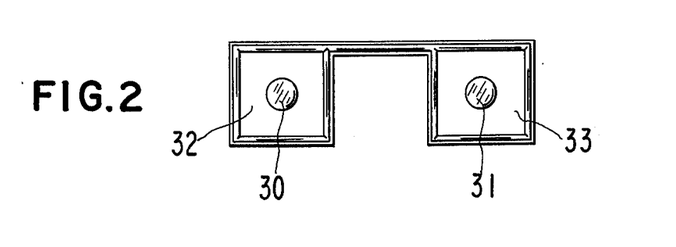
FIG. 2 is an end elevational view of the FIG. 1 embodiment taken from the viewing end.

The construction described immediately supra has been found to be extremely economical and is capable of being completely automated with conventional equipment. In addition, this construction folds extremely flat, is extremely simple to assemble and affords an automatic limit stop to inward telescoping adjustment of lens sections 160, 162 by virtue of the resulting three layered rear edge afforded by tab portions 181-183 of objective lens section 160 and the three layered front edge afforded by tab portions 190, 192 and 193 of ocular lens section 162. (See FIG. 2).

Binocular instruments constructed in accordance with the teachings of the invention can be fabricated from materials which are extremely inexpensive and yet provide a useful, relatively high quality optical instrument. Further, the device is extremely light in weight, and, when collapsed, extremely flat, so that it is convenient to store for future use, to distribute by mail or vehicle delivery and to pack. In addition, information in the form of an advertising message, a commemorative statement, a trademark or the like may be printed on the surface of the instrument, thereby enhancing the attractiveness of the device to advertisers, promoters and others.

While the above provides a full and complete disclosure of the preferred embodiments of the invention, various modifications, alternate constructions and equivalents may be employed without departing from the true spirit and scope of the invention. Therefore, the above description and illustrations should not be construed as limited the scope of the invention, which is defined by the appended claims.

What is claimed is:

1. A collapsible binocular instrument comprising:
   a collapsible objective lens housing having first and second mutually parallel laterally spaced optical column portions;
   first and second objective lens mounting elements moveably secured at an objective end of said first and second column portions, respectively, said first and second objective lens mounting elements including first and second objective lens means, respectively;
   a collapsible ocular lens housing having first and second mutually parallel laterally spaced optical column portions;
   and first and second ocular lens mounting elements moveably secured at a viewing end of said first and second column portions of said ocular housing, said first and second ocular lens mounting elements including first and second ocular lens means, respectively;
   each of said lens mounting elements being moveable from a first viewing position in which said lens means are arranged with their optical axes substantially parallel to the axis of their respective column portions to a second storage position;
   said column portions of said objective and said ocular lens sections being dimensioned for telescoping engagement therebetween.

2. The combination of claim 1 wherein at least one of said lens housings includes a first flexible web portion for joining the respective optical column portions in order to provide an interpupillary adjustment for said binocular instrument.

3. The combination of claim 2 wherein said first flexible web portion has a pair of spaced walls and wherein the other one of said lens housings includes a second web portion adapted to be received in the region between said spaced walls.

4. The combination of claim 3 wherein said flexible web portions are provided with means for limiting relative motion therebetween.

5. The combination of claim 2 wherein the other one of said lens housings includes a second web portion and said first flexible web portion has a length less than the length of the optical column portions of the associated lens housing.

6. The combination of claim 5 wherein said first and second web portions each include mutually facing edges for providing an inward motion limit stop during telescoping motion of said lens housings.

7. The combination of claim 1 wherein said lens mounting elements are pivotally secured at the end of their respective column portions.

8. The combination of claim 7 wherein said lens mounting elements are formed integrally with their respective optical column portions.

9. The combination of claim 8 further including biasing means for urging said lens mounting elements to said first viewing position.

10. The combination of claim 9 wherein said biasing means comprises a spring member having a first arm extending along a surface of said lens mounting element and a second arm extending along a surface of said housing.

11. The combination of claim 9 wherein said biasing means comprises a resilient unitary strip of spring-like material adhered to a surface of said housing and a surface of said lens mounting element.

12. The combination of claim 7 further including a plurality of pull tabs each secured to a different one of said lens mounting elements and extendable outwardly of the associated housing for facilitating movement of the associated one of said lens mounting elements to said first viewing position.

13. The combination of claim 1 wherein said optical column portions are fabricated to a cross-sectional shape selected from the group consisting of substantially circular, triangular, rectangular and polyhedral.

14. The combination of claim 1 wherein said lens mounting elements are removably secured to the end of their respective column portions.

15. The combination of claim 14 wherein each of said lens mounting elements comprises a body member dimensioned for snug engagement with the end portion of the corresponding column portion, and a central region for mounting the associated lens means.

16. The combination of claim 15 wherein said body member has a perimetral configuration of the same geometrical shape as the cross-sectional shape of the corresponding column portion.

17. The combination of claim 16 wherein said perimetral configuration of said body member and said cross-sectional shape are rectangular.

18. The combination of claim 16 wherein said perimetral configuration of said body member and said crosssectional shape are square.

19. The combination of claim 15 wherein said central mounting region is provided with an aperture and the corresponding lens means has a body portion dimensioned for snug engagement in said aperture.

20. The combination of claim 19 wherein said aperture and the cross section of said lens body portion are substantially circular.

21. The combination of claim 14 wherein each of said lens mounting elements comprises a unitary member having a flange portion for providing an abutment stop with the end of the corresponding column portion, a central region located inboard of said flange portion for mounting the associated lens means and an interconnecting portion for joining said flange portion and said central region, said interconnecting portion having an inward taper from the junction thereof with said flange portion to the junction thereof with said central region.

22. The combination of claim 21 wherein the periphery of said flange portion and said central region are generally rectangular.

23. The combination of claim 14 wherein said lens mounting elements comprises a monolithic structure having a body portion dimensioned for a snug engagement with the end portion of the corresponding column portion and a central region defining the associated lens means.

24. The combination of claim 23 wherein said body member has a perimetral configuration of the same geometrical shape as the cross-sectional shape of the corresponding column portion.

25. The combination of claim 24 wherein said perimetral configuration of said body member and said cross-sectional shape are rectangular.

26. The combination of claim 24 wherein said perimetral configuration of said body member and said cross-sectional shape are square.

27. The combination of claim 23 wherein said body portion of each of said lens mounting elements comprises a peripheral flange portion engageable with the outer surface of the end portion of the associated column portion and an interconnecting portion joining said peripheral flange portion and said central region, said interconnecting portion having an inward taper from the junction thereof with said peripheral flange portion to said central region.

28. The combination of claim 27 wherein the externally exposed surfaces of said peripheral flange portion and said interconnecting portion of said lens mounting elements are provided with means for preventing substantial amounts of light incident thereto from reaching said central region.

29. The combination of claim 14 further including retaining means for maintaining said housings and said lens mounting elements in mutual proximity when in the disassembled state.

30. The combination of claim 29 wherein said retaining means comprises a flexible extensive cord member received by said housing and said lens mounting elements and having sufficient length to permit disengagement of said lens mounting elements from said housings.

31. The combination of claim 30 wherein said flexible cord member has a pair of ends each received by a different one of said first and second objective lens mounting elements, the remaining portion of said cord member being arranged to pass through said housing and said ocular lens mounting elements and forming a closed loop in the region external to said ocular lens mounting elements.

* * * * *